United States Patent [19]
Gallo

[11] 3,971,402
[45] July 27, 1976

[54] ROTARY VALVE ASSEMBLY

[76] Inventor: William C. Gallo, 4602-27th Ave. South, St. Petersburg, Fla. 33711

[22] Filed: Apr. 21, 1975

[21] Appl. No.: 570,197

[52] U.S. Cl. .............................. 137/382; 251/309; 251/312
[51] Int. Cl.² .......................................... F16K 5/04
[58] Field of Search ........... 251/304, 309, 310, 312, 251/314, 192, 283; 137/295, 625.47, 382

[56] References Cited
UNITED STATES PATENTS

| | | | |
|---|---|---|---|
| 534,751 | 2/1895 | Melavin | 251/312 |
| 1,792,906 | 2/1931 | Heilos | 251/209 X |
| 2,484,723 | 10/1949 | Pain | 251/310 |
| 2,576,631 | 11/1951 | Mueller et al. | 137/296 |

FOREIGN PATENTS OR APPLICATIONS

| 867,059 | 5/1961 | United Kingdom | 251/312 |
|---|---|---|---|

*Primary Examiner*—Martin P. Schwadron
*Assistant Examiner*—Richard Gerard
*Attorney, Agent, or Firm*—Robert Henderson

[57] ABSTRACT

An inverted, manually operable, cylindrical, inverted-cup-shaped valve element is turnable axially back and forth between an open position in which an aperture in said element's side wall registers with a fluid passage of a fixed central core of the valve and an opening in the housing of the valve to permit fluid to flow therethrough and a closed position in which a non-apertured portion of said element's side wall registers with the valve's said fluid passage and said opening to close said passage against flow of fluid therethrough. An operating knob is provided for manually turning said valve element, and means are provided for limiting the turning of said valve element to considerably less than a full turn.

1 Claim, 4 Drawing Figures

ROTARY VALVE ASSEMBLY

BACKGROUND OF THE INVENTION

Prior valves have been more complex and more costly to produce. Simplicity in the valve of this invention, leading to substantial economy of production and, at the same time deriving improved operational characteristics, have resulted from several major remedies of this invention to shortcomings of prior valves. The principal shortcomings of comparable valves have been (1) the use of tapered valve elements having a strong and objectionable tendency to stick, rendering the valve difficult to operate and often requiring springs to keep the valve elements sufficiently biased in place in the valve, and (2) the use of valve elements (both tapered and cylindrical) which were hollow and not properly supported internally either to resist inwardly directed fluid pressure therein or to serve adequately to prevent fluid leakage through the valve.

The following description will show how the two above-mentioned shortcomings and many of the complexities of prior valves have been remedied in the valve of this invention, and how the valve as a whole has been simplified.

DETAILED DESCRIPTION OF THE INVENTION

Figure 1:
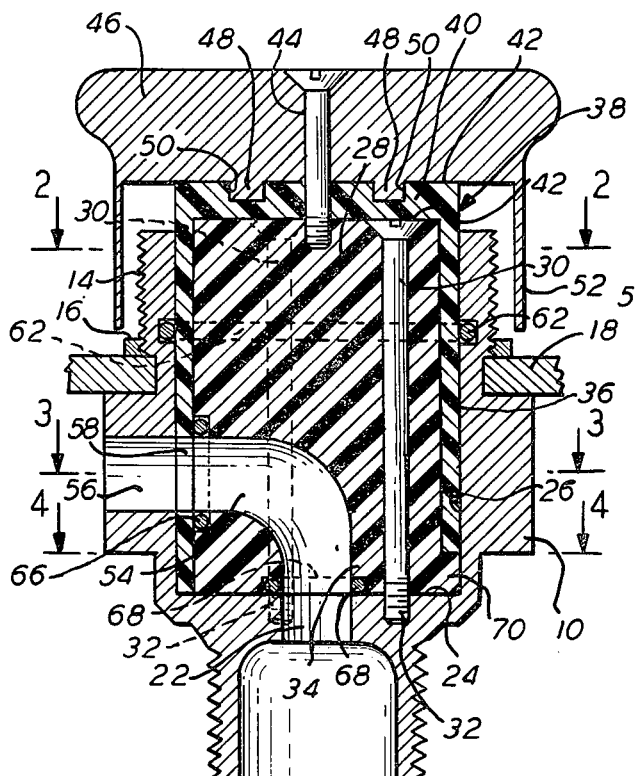
FIG. 1 is a central, sectional view of a valve according to a preferred embodiment of this invention, showing the valve in open condition.
Figure 2:
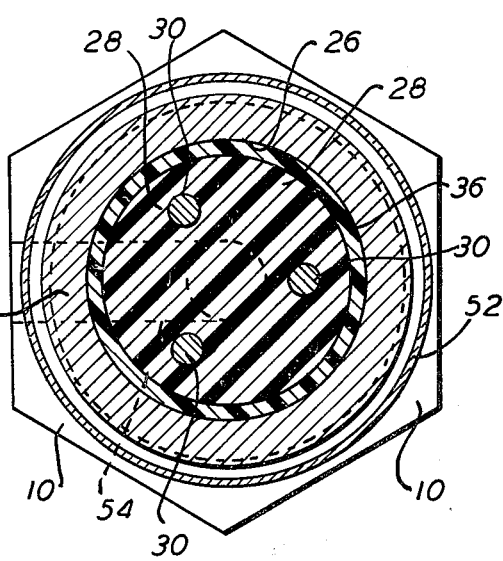
FIGS. 2, 3, and 4 are cross sectional views, substantially on the lines 2—2, 3—3, and 4—4, respectively, of FIG. 1.

The illustrated valve comprises a housing 10, preferably of brass or other material suitable for handling the fluid medium to be controlled by the valve. The lower end of the housing is suitably threaded as at 12 to facilitate attachment of the valve to a fluid carrying pipe, and is threaded as at 14 at a reduced diameter upper end portion to receive a nut 16 for securing the housing firmly to a counter or equivalent member 18.

The lower end of the housing has a fluid-conducting bore 20 opening at its upper end into a relatively short counterbore 22 which extends centrally upwardly, free of closure, to the bottom, circular wall 24 of a relatively large, cylindrical, axial bore 26 which, except for parts hereinafter described, would open at the upper end of the housing 10.

A cylindrical core 28, which may be of plastic material, preferably not subject to material swelling or shrinking from temperature changes and suitable for handling a particular fluid to be controlled by the valve, is firmly held in a central position in the bore 26 by long screws 30 extending axially but eccentrically downwardly through the core, the lower ends of these screws being threaded tightly into the housing 10 as at 32. The bottom of the core 28 is flat and is firmly held upon the bottom wall 24 of the bore 26 by the mentioned screws.

The diameter of the core 28 is somewhat less than the inside diameter of the bore 26, providing therebetween an area for accurate, rotative reception therein of a depending cylindrical wall 36 of an inverted-cup-shaped valve element 38. This valve element has an integral, flat top 40 resting upon a flat top surface 42 of the core and is held down upon the core by a single screw 44 which extends coaxially downwardly through a preferably circular operating knob 46, thence through the center of the valve element's flat top 40 and into the center of the top area of the core 28, into the latter of which the screw 44 is tightly threaded.

The portion of screw 44 which extends through the knob 46 and the valve element's flat top 40 is non-threaded and fits in the knob 46 and the valve element 38 with a fit which is accurate but not tight enough to inhibit rotation of said knob and the valve element. The valve element 38 is constrained to turn with the knob 46 by the provision of a detent arrangement of integral dogs 48 on the bottom of the knob 46 extending into recesses 50 formed in the top 40 of the valve element. The operating knob 46, preferably, is provided with an integral cylindrical skirt 52, obscuring the threads 14, opposing the entry of deleterious matter into working parts of the valve and, generally, improving the appearance of the valve as a whole.

The counterbore 22 in the housing 10 constitutes a fluid passage leading into an elbow shaped passage 54 which is in the core 28 and in fixed relation to and, in open condition of the valve, leads fluid into and through a passage 56 which may lead into further piping (not shown). In a manner now to be described, the flow of fluid through bore 20, counterbore 22, and passages 54 and 56, all of which are in fixed interrelationship, is controlled by limited back and forth turning of the valve element 38 by suitable operation of the knob 46.

The cylindrical wall 36 of the valve element 38 is formed with an opening constituting a fluid passage 58 (FIGS. 1 and 3) in horizontal alignment with the discharge passage 56 and with the adjacent outer end of the elbow shaped passage 54. The fluid passage 58 is shown in FIG. 3 approximately 90° out of register with reference to the discharge passage 56 so that the latter is completely blocked off by a solid portion of the valve element's cylindrical wall 36; hence, as in FIG. 3, the valve is in closed condition.

Figure 3:
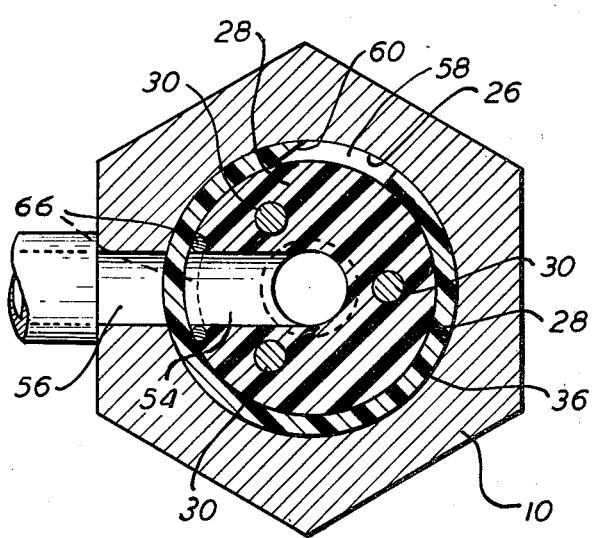

However, rotation of the valve element 38 counterclockwisely, as viewed in FIG. 3, to the extent of about 90° will bring the fluid passage 58 of the valve element's cylindrical wall 36 into register with the passage 56, as in FIG. 1, thereby opening the valve. One end of the passage 58 is advantageously tapered as at 60 (FIG. 3) to result in smoother operation of the valve during both opening and closing thereof.

O type sealing rings 62, 66, and 68, or other suitable sealing rings, are provided at suitable locations to oppose leakage of fluid from the valve; preferred locations therefor being shown in FIG. 1.

Figure 4:
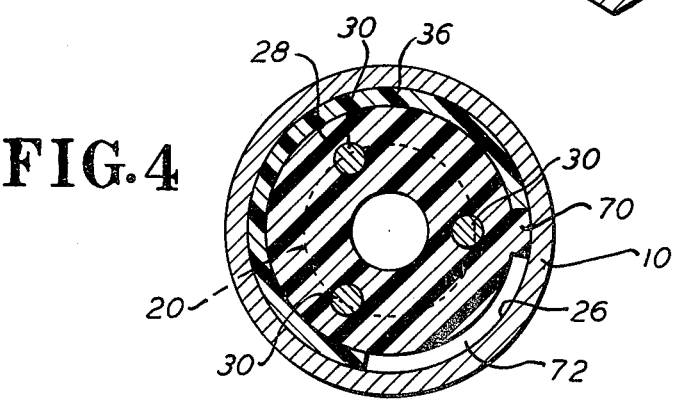

It has been indicated that the valve operates through back and forth rotation of the valve element 38 within a limit of about 90°. To maintain that limit of rotation, the lower end of the core 28 has an integral dog 70 (FIGS. 1 and 4) which limits rotation of the valve element by its disposition in an arcuate cut away area 72 (FIG. 4) at the lower end of the cylindrical wall 36 of the valve element. The indicated desired limiting of rotation of the valve element results from the fact that the opposite ends of the area 72 alternately abut the fixed dog 70 as the operating knob is turned to open or close the valve.

I claim:

1. A valve comprising a housing formed with a cylindrical bore opening at one end of said housing and terminating at its other end within said housing; a cylindrical core fixed coaxially within said bore in sealed relation to the bore's said other end, said core being of lesser diameter than said bore to provide an intervening cylindrical area between the bore and the core; a one piece, inverted-cup-shaped valve element having a depending cylindrical wall extending with a close sliding fit within said intervening cylindrical area substantially throughout the axial dimensions of said core, and a radially extending top, integral with said depending cylindrical wall; a manually operable one piece inverted-cup-shaped knob having a radially extending portion intimately overlying said top of the valve element, said knob and the top of the valve element being provided with coacting recesses and dogs constraining the knob and the valve element to turn in unison; a generally ell shaped fluid passage in said core communicating between a central area at the bottom of the core and a side area at one side of the core, separate fluid passages in said housing connecting said central and side areas of the core with distal fluid supply and fluid discharge areas; said depending cylindrical wall of the valve element having an opening of limited size, alignable with a side end of said ell shaped passage by turning of said valve element to permit fluid flow from the latter passage to one of said separate fluid passages in the housing; and said fluid flow being discontinuable by turning of said valve element to bring said opening into non-alignment with said side end of the ell shaped passage.

* * * * *